J. C. GOOSMANN.
OIL SEPARATOR.
APPLICATION FILED FEB. 28, 1921.
1,408,454. Patented Mar. 7, 1922.
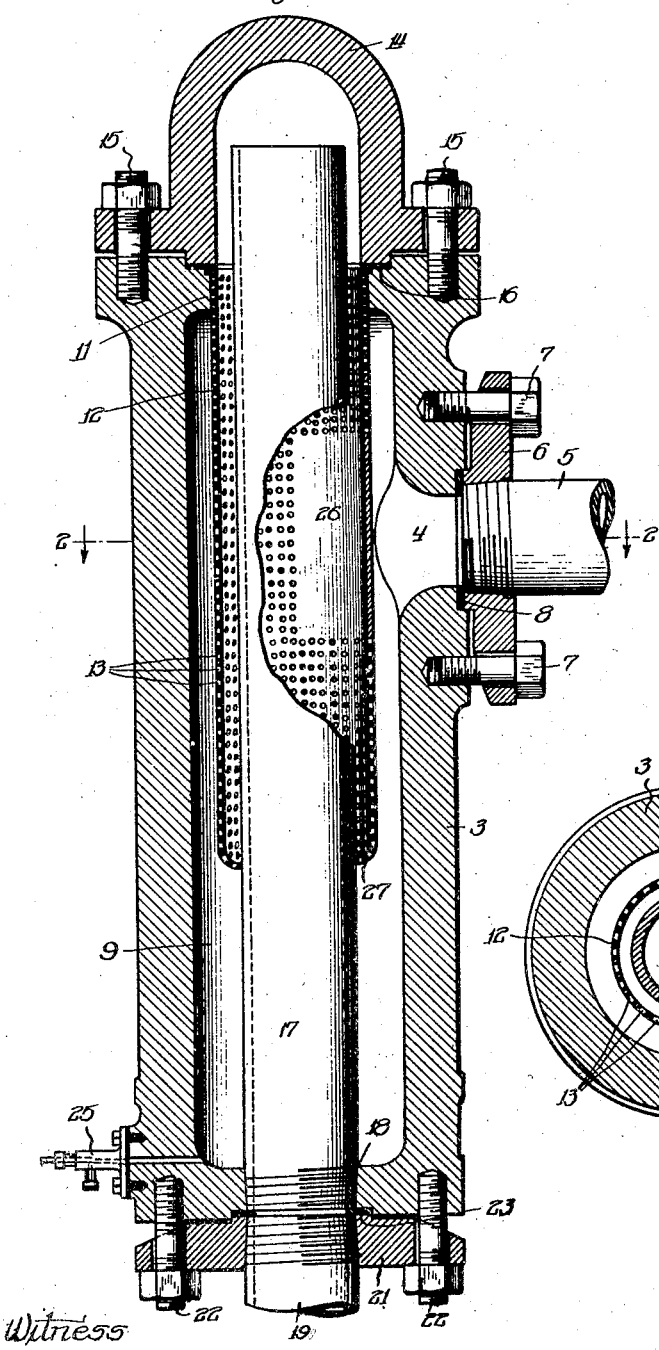
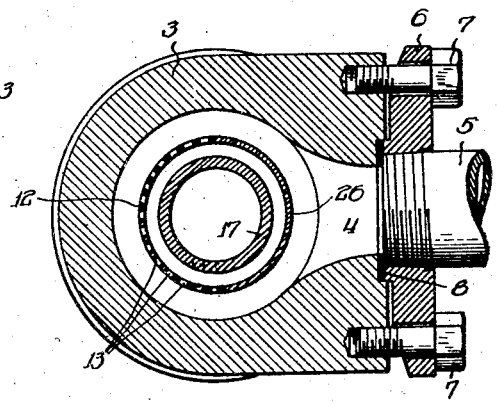
Witness
R. Burkhardt
Inventor:
Justus C. Goosmann

UNITED STATES PATENT OFFICE.

JUSTUS C. GOOSMANN, OF PEORIA, ILLINOIS.

OIL SEPARATOR.

1,408,454.  Specification of Letters Patent.  Patented Mar. 7, 1922.

Application filed February 28, 1921. Serial No. 448,452.

*To all whom it may concern:*

Be it known that I, JUSTUS C. GOOSMANN, a citizen of the United States, residing at Peoria, in the county of Peoria and State of Illinois, have invented certain new and useful Improvements in Oil Separators, of which the following is a specification.

This invention relates to oil separators and the like adapted for separating oil from fluids such as steam, gases and the like, and while particularly suitable for such purposes, it is also capable of use as, and well adapted for, a scale trap for the separation of scale, sediment, sludge, etc., from various fluids.

Various separators for the purposes indicated, with which I am familiar, are so constructed that after a quantity of oil has accumulated therein the fluid flowing through the separator is compelled to travel through the accumulated oil, with the result that instead of having the entrained oil separated therefrom the flowing fluid picks up more oil from the accumulation in the separator than it originally carried with the result that the outflowing fluid carries more oil than it did when entering the separator.

One of the primary objects of my present invention is to provide a separator in which the fluid flowing therethrough will not be compelled to pass through the oil which may be accumulated therein, and one which will be efficient and reliable in operation so that it will effectively separate and remove the entrained oil from the fluid passing therethrough, and one which will be simple in construction, cheap to manufacture, which will not be liable to get out of order, and which can be readily taken apart for purposes of cleaning when necessary.

Other objects and many of the inherent advantages of this invention should be readily appreciated by those skilled in the art, as the same becomes better understood by reference to the following description when considered in connection with the accompanying drawings.

Referring to the drawings—

Fig. 1 is a longitudinal sectional view through a separator embodying my invention; and Fig. 2 is a transverse sectional view, taken on the line 2—2 of Fig. 1.

Referring now to the drawings more in detail it will be observed that my separator comprises primarily a body 3 generally tubular in shape and provided remote from its bottom with an inlet port 4 through which gases or other fluids from which the oil is to be separated may enter. The inlet pipe 5 may be connected to the body in any suitable manner, but in the present instance I have shown for purposes of illustration a flange coupling comprising a flange 6 threaded onto the pipe and adapted to be secured to the separator body by lag-bolts 7, a gasket 8 being preferably interposed between the flange or pipe end and the body to insure against leakage.

The body 3 is hollow to provide a chamber 9 extending longitudinally thereof, and its upper end is shaped to provide an internal flange 11 leaving a central opening of less diameter than the chamber 9. A cylindrical screen 12 is suspended at its upper end from this flange and preferably this screen is of sheet-metal construction provided with small perforations 13, as shown, which offer but slight resistance to the passage of gas therethrough, but serve to prevent the passage of oil globules which consequently deposit on the screen and flow downwardly to the lower end thereof. The body of the chamber is closed by a hollow cap 14 flanged for attachment to the upper end of the body by means of bolts 15 or otherwise, a gasket 16 being preferably interposed between the body and the cap to preclude leakage.

It will be manifest that the separator chamber is divided by the screen 12 into two compartments, the outer or inlet one of which communicates with the inlet port 4, and the inner or outlet one of which extending upwardly into the cap 14 communicates with the intake end of an outlet pipe 17 which projects upwardly in the chamber through the screen into the cap 14 as is shown in Fig. 1. The lower end of this pipe is preferably threaded into a tapped opening in the bottom wall of the body 3 as indicated at 18 and communication between this pipe and the delivery pipe 19 from the separator is established by connecting the delivery pipe to the bottom of the body in any suitable manner. In this instance a flange coupling including a flange 21 threaded into the pipe 19 and secured to the body 3 by bolts 22 is shown, a gasket 23 being interposed between the pipes 17 and 19 to insure against leakage. The bottom of the chamber 9 is also provided with a drain port 24 controlled by a drain cock 25 of any preferred construction.

In order to prevent the oil and other liquids delivered from the port 4 from passing directly through the screen 12 under pressure, I provide in front of this port a deflector or baffle which deflects the inflowing fluids and causes them to circulate to a certain extent within the chamber 9 before passing through the screen to the outlet pipe. This deflector may be attached to the screen member 12, but preferably for simplicity and economy of construction, I prefer to leave a portion of this screen imperforate as indicated by reference character 26, this imperforate portion being disposed in alignment with the port 4, extending a short distance above and below the port and substantially half way around the screen member. It will be observed also that the lower end of the screen member is turned inwardly as indicated at 27 to somewhat snugly fit the perimeter of the pipe 17 so that no fluid may travel from the inlet port to the intake end of the outlet pipe without passing through the screen.

In the operation of my improved separator the inflowing oil and gas first encounters the baffle or deflector 26 by which it is deflected and caused to travel in all directions from the port. As the fluid seeps through the screen 12 the oil is collected by the screen upon which it accumulates and flows downwardly to the lower part of the separator chamber, the fluid separated from the oil passing on and upwardly into the intake end of the outlet pipe 17 by which it is delivered from the separator. It will be manifest that an accumulation of oil in the lower part of the chamber will not detrimentally affect the operation of the device, since even if the oil level rises approximately to the inlet port there is still sufficient screen surface uncovered by the oil to effectively perform the separating function and in no event is the fluid compelled to travel through, or beneath the surface of, any oil which may be accumulated in the chamber. The accumulated oil is, of course, withdrawn periodically by opening the drain cock 25. It will also be manifest that this structure will separate any scale, sediment, sludge or other solid matter delivered through the port 4, and is capable of employment solely as a scale trap as well as for an oil separator.

It is believed that my invention and many of its inherent advantages will be understood from the foregoing without further description, and it should be obvious that the size, shape, proportion and arrangement of the parts may be varied within wide limits without departing from the essence of the invention as defined in the following claims.

I claim:

1. An oil separator, comprising a vertically disposed chamber closed at its upper end and having an inlet port disposed between the ends thereof, an outlet pipe projecting upwardly through the bottom of said chamber to a point near the top thereof, a cylindrical screen suspended from its upper end within said chamber and surrounding said outlet pipe, the lower end of the screen being contiguous to said pipe, and an imperforate baffle plate carried by said screen in opposed relation to said inlet port.

2. An oil separator comprising a vertically disposed chamber provided with a laterally opening inlet port spaced from the bottom thereof, a downwardly delivering outlet pipe projecting upwardly in said chamber to a point above said port, a cylindrical screen disposed around said pipe between its ends so that fluid must pass therethrough enroute from said port to said outlet pipe, and a deflector disposed in front of said port.

3. An oil separator comprising a vertically disposed chamber closed at its upper end and provided with an inlet port, an outlet pipe projecting upwardly in said chamber to a point above said port, and a cylindrical perforated member surrounding said pipe, said member being imperforate to provide a baffle in front of said port.

4. An oil separator comprising a hollow body provided with a lateral intake port and having its upper end provided with an internal flange, a cylindrical perforated member suspended from said flange, a cap closing the upper end of said body, and an outlet pipe projecting upwardly through said body into said cap, said perforated member being imperforate to provide a deflector in front of said inlet port.

JUSTUS C. GOOSMANN.